July 27, 1965  J. A. SARGROVE  3,197,027
TAPER GAUGING AND SORTING APPARATUS
Filed April 13, 1962  18 Sheets-Sheet 1

INVENTOR
JOHN ADOLPH SARGROVE
BY Hamm and Nydick
ATTORNEYS

July 27, 1965   J. A. SARGROVE   3,197,027
TAPER GAUGING AND SORTING APPARATUS
Filed April 13, 1962   18 Sheets-Sheet 2

INVENTOR
JOHN ADOLPH SARGROVE

BY Hame and Nydit

ATTORNEY

July 27, 1965  J. A. SARGROVE  3,197,027
TAPER GAUGING AND SORTING APPARATUS
Filed April 13, 1962  18 Sheets-Sheet 3

INVENTOR
JOHN ADOLPH SARGROVE
BY Hane and Nyeik
ATTORNEYS

INVENTOR
JOHN ADOLPH SARGROVE

BY Kane and Nydick

ATTORNEYS

July 27, 1965    J. A. SARGROVE    3,197,027
TAPER GAUGING AND SORTING APPARATUS
Filed April 13, 1962    18 Sheets-Sheet 6

INVENTOR
JOHN ADOLPH SARGROVE
BY
ATTORNEY

July 27, 1965 J. A. SARGROVE 3,197,027
TAPER GAUGING AND SORTING APPARATUS
Filed April 13, 1962 18 Sheets-Sheet 7

INVENTOR
JOHN ADOLPH SARGROVE
BY Hane and Nydick
ATTORNEYS

July 27, 1965  J. A. SARGROVE  3,197,027
TAPER GAUGING AND SORTING APPARATUS
Filed April 13, 1962  18 Sheets-Sheet 10

INVENTOR
JOHN ADOLPH SARGROVE
BY
ATTORNEY

July 27, 1965 J. A. SARGROVE 3,197,027
TAPER GAUGING AND SORTING APPARATUS
Filed April 13, 1962 18 Sheets-Sheet 11

INVENTOR
JOHN ADOLPH SARGROVE
BY Hane and Nydick
ATTORNEY

July 27, 1965   J. A. SARGROVE   3,197,027
TAPER GAUGING AND SORTING APPARATUS
Filed April 13, 1962   18 Sheets-Sheet 12
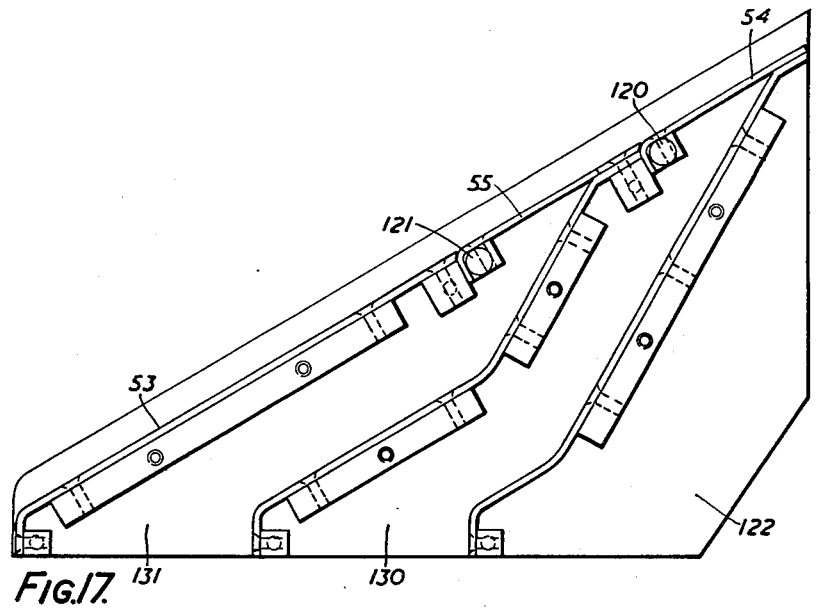
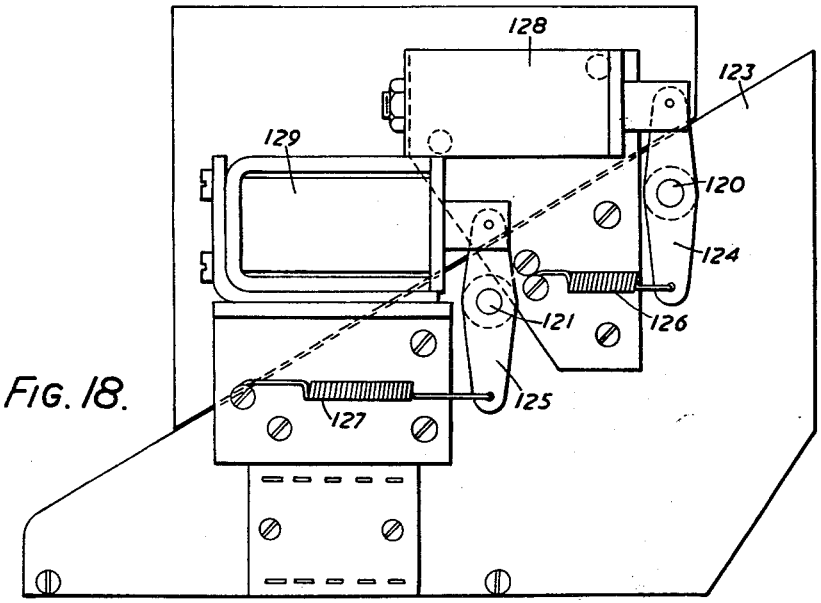
INVENTOR
JOHN ADOLPH SARGROVE
BY Hane and Nydick
ATTORNEY

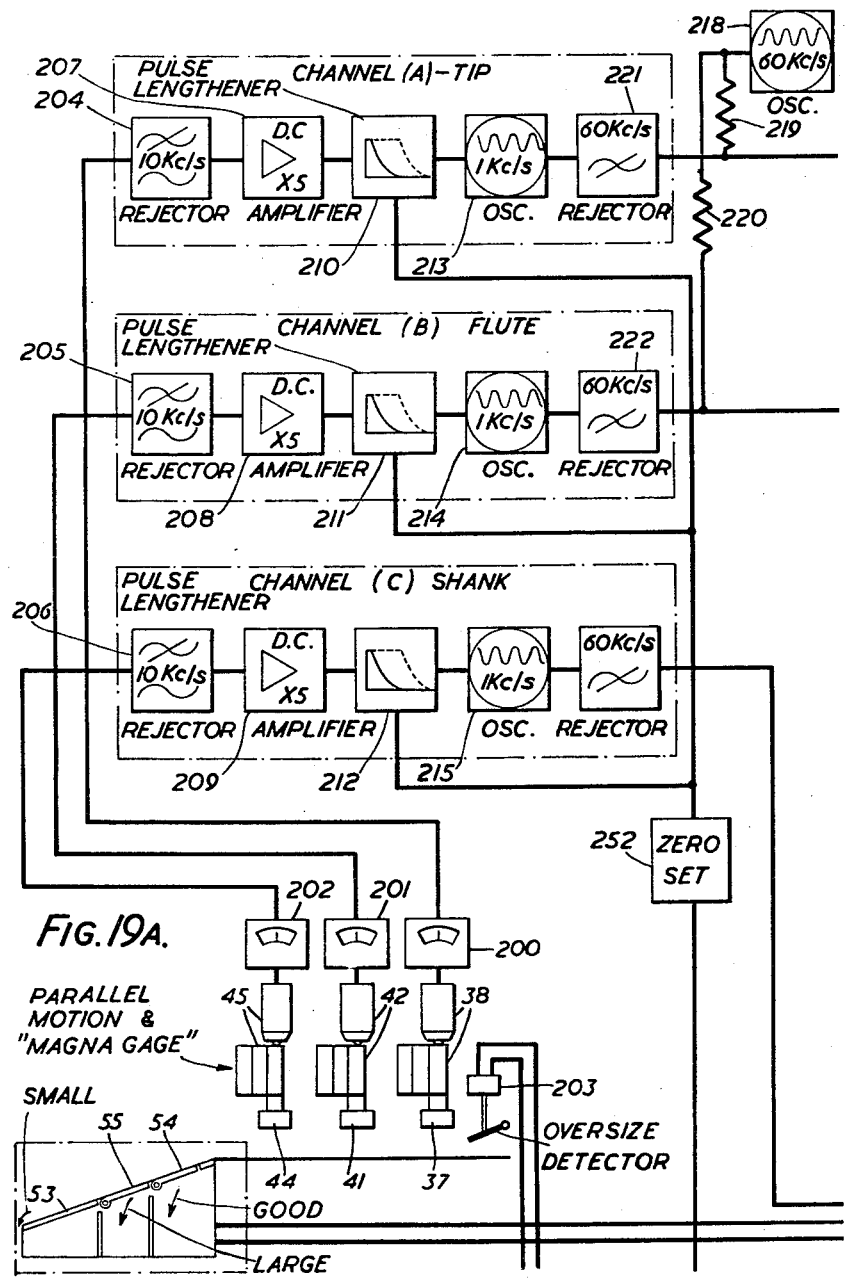

July 27, 1965  J. A. SARGROVE  3,197,027
TAPER GAUGING AND SORTING APPARATUS
Filed April 13, 1962  18 Sheets-Sheet 14

INVENTOR
JOHN ADOLPH SARGROVE
BY Hane and Kydink
ATTORNEYS

July 27, 1965 J. A. SARGROVE 3,197,027
TAPER GAUGING AND SORTING APPARATUS
Filed April 13, 1962 18 Sheets-Sheet 15

INVENTOR
JOHN ADOLPH SARGROVE
BY Hane and Nydick
ATTORNEYS

United States Patent Office 3,197,027
Patented July 27, 1965

3,197,027
TAPER GAUGING AND SORTING APPARATUS
John Adolph Sargrove, Chertsey, Surrey, England, assignor to The Sheffield Twist Drill & Steel Company Limited
Filed Apr. 13, 1962, Ser. No. 187,399
Claims priority, application Great Britain, Apr. 25, 1961, 14,898/61
21 Claims. (Cl. 209—88)

This invention relates to an apparatus for gauging automatically the diameter of an object that has a surface of which the cross-sectional shape approaches a circle, or of which the envelope approaches a circle, and of which it is desired to gauge the maximum diameter. More specifically the invention concerns the gauging of such an article to determine its departure from cylindricality, or a predetermined taper.

The primary application of the invention is to the gauging of twist drill and like tool bits. It is highly desirable that drill bits should be gauged individually before sale or use but the tolerances laid down for the dimensions of drill bits are such that it is a matter of great technical difficulty to devise a machine that will gauge bits automatically and rapidly. In the first place, a drill bit is not of circular cross-section, and the cross-sectional shape has flutes presenting cutting edges, usually two; behind the cutting edges the cross-sectional shape is relieved by lands of slightly less diameter than the cutting edges. The diameter of the hole produced by the drill bit will be determined by the diameter at the cutting edges.

However, the problem of gauging the drill is made much more acute by the fact while there is a tolerance laid down for the diameter of the cutting edges of a bit of nominal size, there is also a tolerance on the taper of the drill bit from its tip towards its shank. Whatever the dimensions of the tip diameter, the shank of the drill bit must be of slightly less diameter in order that the bit shall not jam and break in the hole which it drills, or squeak and heat up while drilling. The angle of this taper is very small and it is not practical to measure the taper directly as an angle; the taper is best measured by a series of diametrical measurements of the drill bit.

However, the tolerances on the tip diameter, and consequently on shank diameter, are such that the taper angle of a drill bit cannot be indicated merely by measuring the diameter of the drill bit at its tip and shank since the tolerance on diameter, as diameter, is not the same as the tolerance on diameter as taper so that these dimensions must be related to establish that the taper also is within the correct tolerances.

Put another way, this means that a bit could have to tip diameter that falls within the tolerance limits, but towards the lower limit and a shank diameter that falls within the tolerance limits but towards the upper limit, but the bit would be reject since that combination of tip and shank diameters gives an unacceptable taper-angle.

This consideration imposes great difficulty on the design of a machine which will correctly gauge drill bits on this basis. So far as we are aware, no machine has ever been made which will satisfactorily perform this multiple gauging operation of drill bits.

The present invention is concerned with a machine that can be used in gauging drill bits both as to diameter and taper.

Broadly, the invention consists of a method of automatically gauging a maximum diameter of a tool bit or the like that is elongated, and of which the cross-sectional shape is approximately but not precisely circular, which method comprises rotating said tool between gauging surfaces while maintaining said surfaces in contact with the tool bit at a first point along its length, deriving an electrical signal which is a function of the separation of said surfaces and determining a peak value of a component of said signal indicative of the maximum separation of said surfaces, rotating said tool between gauging surfaces in contact with the tool bit at a second point along its length, deriving a second such signal indicative of the separation of the surfaces at said second point, and comparing said signals to derive a further electrical signal which is used in a subsequent dimensional classification of the tool bit.

The method of automatically gauging a maximum diameter of a tool bit or the like that is elongated and bowed, and of which the cross-sectional shape is approximately but not precisely circular, which comprises rotating said tool between gauging surfaces while maintaining said surfaces in contact with the tool bit at a first point along its length, deriving an electrical signal which is a function of the separation of said surfaces and determining a peak value of a component of said signal indicative of the maximum separation of said surfaces, rotating said tool between gauging surfaces in contact with the tool bit at a second point and a third point along its length, deriving second and third such signals indicative of the separation of the surfaces at said second and third points, and comparing said signals to derive a further electrical signal which is used in a subsequent dimensional classification of the tool bit, the tool bit being supported during its rotation between said gauging surfaces.

An apparatus for automatically gauging the diameter of an elongated tool bit or the like of which the cross-sectional shape is approximately by not precisely circular and for gauging the departure of diameters of the bit along the length of the bit from a predetermined relationship, which comprises means for presenting the bit and to rotate it between gauging surfaces engaging the bit at a first position along its length and for presenting the bit and to rotate it between gauging surfaces engaging the bit at a second position along its length, first and second means responding to the separation of the gauging surfaces at the two said positions for deriving first and second electrical signals and determining a peak value of a component of each of said signals indicative of the maximum separation of said surfaces at said first and second positions, and means for comparing said signals to derive a further electrical signal which is used in a subsequent dimensional classification of the tool bit.

Further features and advantages of the invention will appear from the following description of one embodiment thereof, given by way of example, in conjunction with the accompanying drawings, in which:

FIGURE 17 is a view of the drill bit "pass-reject" device;

FIGURE 18 is a side view showing the actuating means for the mechanism shown in FIGURE 17;

FIGURES 19A to 19F are diagrams showing the general functional system-arrangement of the apparatus shown in the previous drawings.

Figure 1A:
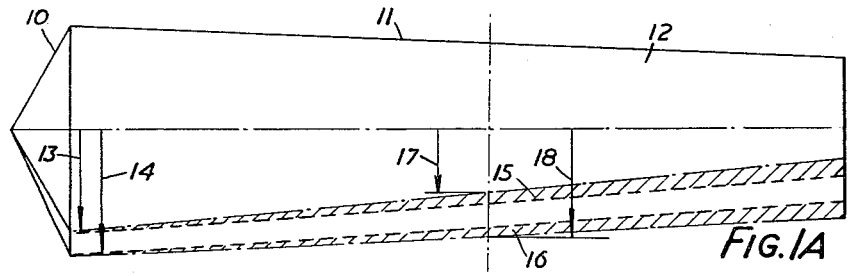
FIGURES 1A and 1B are diagrams indicating the tolerances that are permitted on a twist drill bit.
Figure 1B:
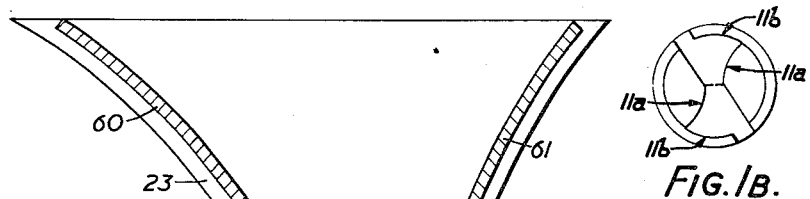
Figure 13:
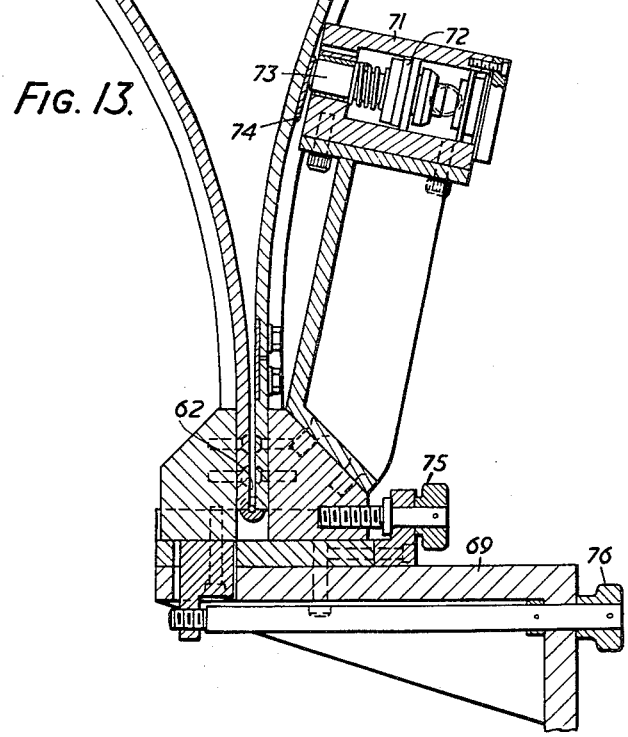
FIGURE 13 is a sectional view taken on the line 13—13 of FIGURE 12.

Turning now to FIGURES 1A and 1B, these indicate in greatly exaggerated form the shape of a twist drill "bit." The "bit" has a pointed front end 10, a fluted part which can be considered to extend over part 11 of the length and a final shank portion 12; the flutes are omitted for clarity in FIGURE 1A, but are indicated at 11a in FIGURE 1B. FIGURE 1B also shows, much exaggerated, the lands at 11b. As explained above, it is permitted that there shall be a tolerance on the diameter of the tip of the bit, so that the permissible variation might be the radius 13 as a minimum and the radius 14 as a maximum. If any bit should have a tip radius such as 13, then the taper on the fluted part of the tip must lie within the shaded portion 15. On the other hand, if the tip should have a radius such as 14 then the taper must lie within the shaded portion 16. It is also permitted that the diameter of the end of the fluted portion 11 can lie between a minimum diameter represented by radius 17 and a maximum diameter represented by radius 18, but not independently of the "tip radius" 13 or 14. Thus, if a "bit" has a tip radius such as 13, it would not be permitted that the rear radius of the fluted part should be as big as the radius 18, since this would not provide the necessary taper on the fluted part of the bit. It will be seen, therefore, that it is necessary to have regard to the tip radius, such as 13 or 14, before the permitted radius, such as 17 or 18, at the rear part of the fluted section 11 of the bit can be determined. It is with this problem that the apparatus of the present invention is concerned. The embodiment of the invention to be described, enables drill bits and the like to be gauged to this specification.

With present standards the tolerances on radius and taper of the drill bit extends to the rear end of the shank 12. The present invention enables these tolerances also to be ascertained.

It is emphasized that the diagram of FIGURE 1A is much exaggerated in the angles of taper and the tolerances shown; in practice the tolerances are very small, and in many cases, with smaller drill bits, only fractions of a mil. This, of course, adds to the difficulty of design of a gauging machine for this service.

In carrying the present invention into effect, by the embodiment to be described, it is arranged that a drill is first measured as to its tip diameter, which will indicate its tip radius, such as 13 or 14.

The choice of the tip as a position for measurement is arbitrary, and if desired measurements can be made at any positions along the length of the bit, but it is advantageous to make the measurement at the tip since the effective cutting diameter of the drill bit can be measured at this point. The bit is then subsequently measured as to the radius at the end of the fluted part 11 of the bit, and it is ascertained whether or not the drill falls within the desired tolerance on the absolute diameters at this point, and also on the diameter relative to the first measurement, as determined by the tolerance on taper. The rear end of the shank can then be measured, and again determined whether or not it falls within the absolute or relative tolerances.

Also, with the apparatus described, a drill bit which is very slightly "bowed," the axis of the bit being not perfectly straight, will be accepted as being within the tolerances. This is deliberate, as a drill bit of this nature is not a reject if it otherwise comes within the set tolerances.

Figure 2:
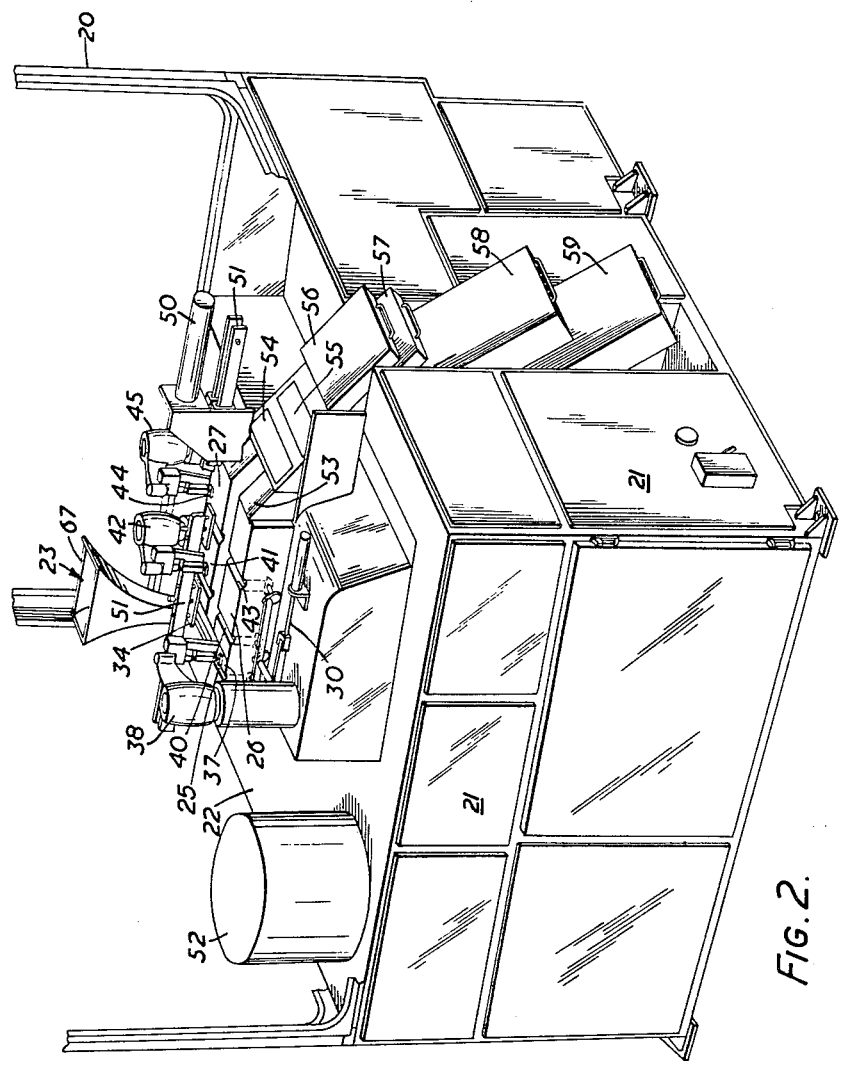
FIGURE 2 is a diagrammatic simplified perspective view of an embodiment of the invention, certain parts being omitted for clarity.

Turning now to FIGURE 2, which is a diagrammatic perspective view of the complete apparatus, this comprises a framework 20, fabricated from metal angle, and clad on its lower part with suitable panels 21, which can be removed to give access to the lower part of the apparatus. A generally horizontal platform 22 is provided at about the mid portion of the framework, above which is arranged the general gauging parts of the apparatus.

Figure 10:
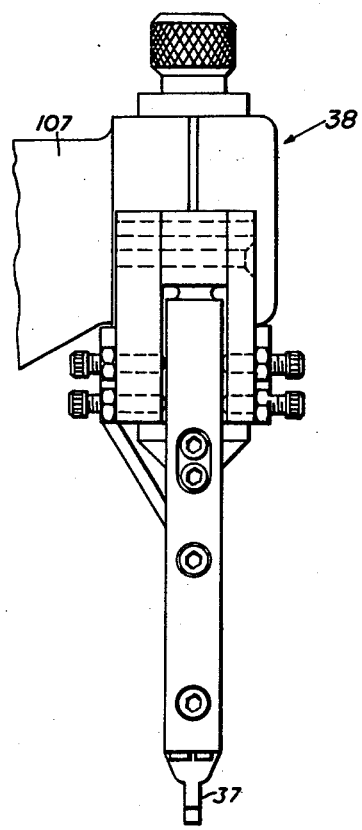
FIGURE 10 is a front elevation of the parts shown in FIGURE 8.

The drill bits to be gauged are placed within a hopper 23 from the bottom of which they are fed, as at 24, into a groove 25 formed in a test bed constructed in two main parts 26, 27. When the bit 24 is in position in groove 25, the bottom of the groove, which is formed in a separate member, is raised by means of an air operating cylinder 28 the ram 30 of which is coupled to three cranks 31, 32, 33 of which the first, 31, raises the bottom of the groove 25. At this time a drive plate 34 engages the drill bit, and rolls it over the surface of the test bed 26, 27. In this motion, the bit is caused to roll beneath the surface of a test shoe 37 (see FIGURES 2, 8 and 10) which is coupled to a transducer which is indicated generally at 38. Owing to the existence of lands on the drill bit, the shoe 37 will rise and fall slightly above the test bed 26, 27 as the bit rolls beneath the shoe, but the maximum separation of the shoe from the bed will be an indication of the maximum tip diameter of the drill bit. Accordingly, a voltage output of the transducer 38 attains a peak value that will be a measure of the maximum diameter of the drill bit tip.

The drill bit will continue to roll in this way until it falls into a second groove 40. Thereby, it is re-aligned across the width of the test bed so that should it have rolled slightly out of the position truly at right angles to the length of the bed, it will be restored to this position when it enters groove 40. The cylinder 28, by means of crank 32, then raises the bottom of groove 40, provided in a manner similar to groove 25, and the drill now rolls beneath a second test shoe 41 similar to shoe 37. In a similar way, the diameter of the drill bit at the base of the fluted portion is measured by means of the shoe 41 and the associated transducer 42, and a measure is obtained of the diameter of the drill bit at this point, by reason of the peak voltage output of transducer 42.

The diameter of the bit at the base of the shank is determined in a similar manner by means of a further groove 43, in to which the bit drops for re-alignment as described above, and from the bottom of which the bit is raised by means of the crank 33, and then rolled by the drive plate 35 beneath a third test shoe 44 similar to shoes 37 and 41, with which is associated a third transducer 45.

When the first drill bit has reached the second groove 40 a succeeding drill bit from the hopper is fed into groove 25. When this second bit has reached groove 40, and the first bit reached groove 43, a further drill bit is fed into groove 25. In this way, there is a continuous succession of bits, three at a time, being gauged within the apparatus.

Figure 3:
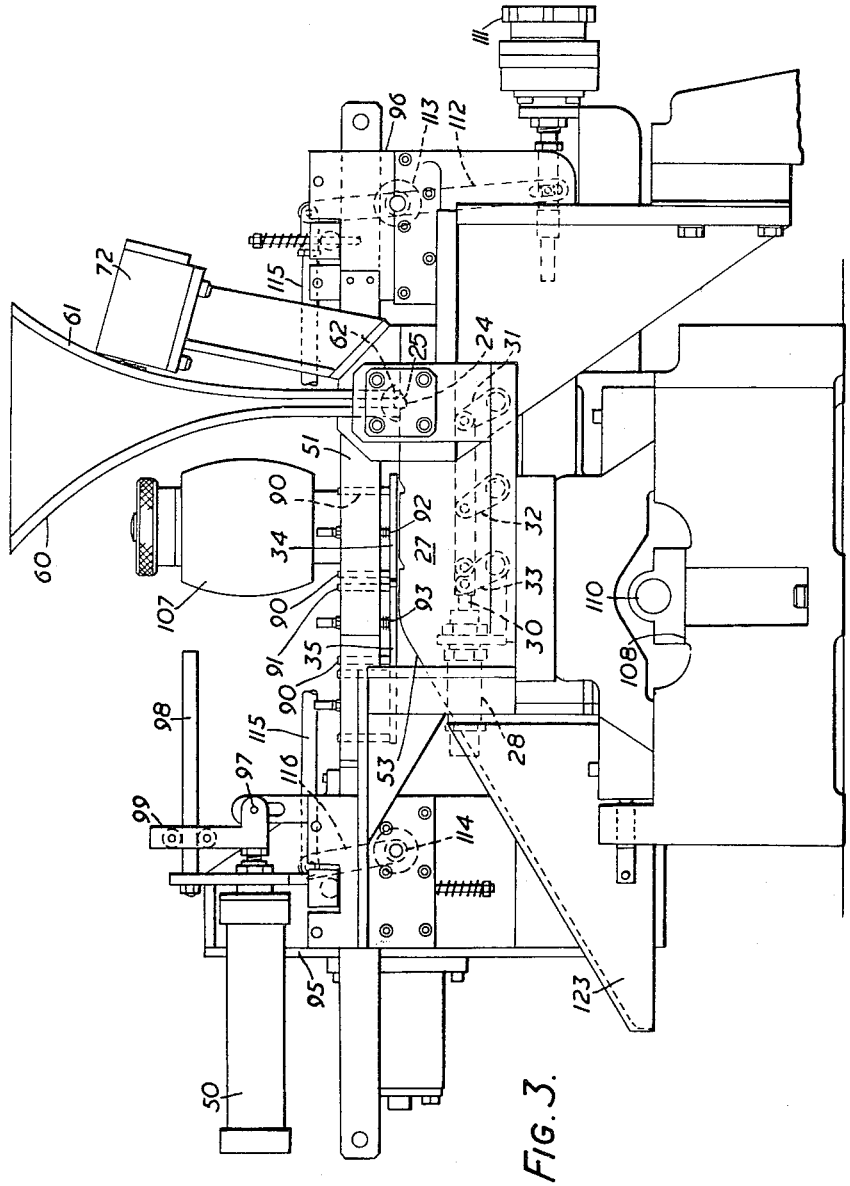
FIGURE 3 is a side elevational view of the upper part of the apparatus shown in FIGURE 2.
Figure 4:
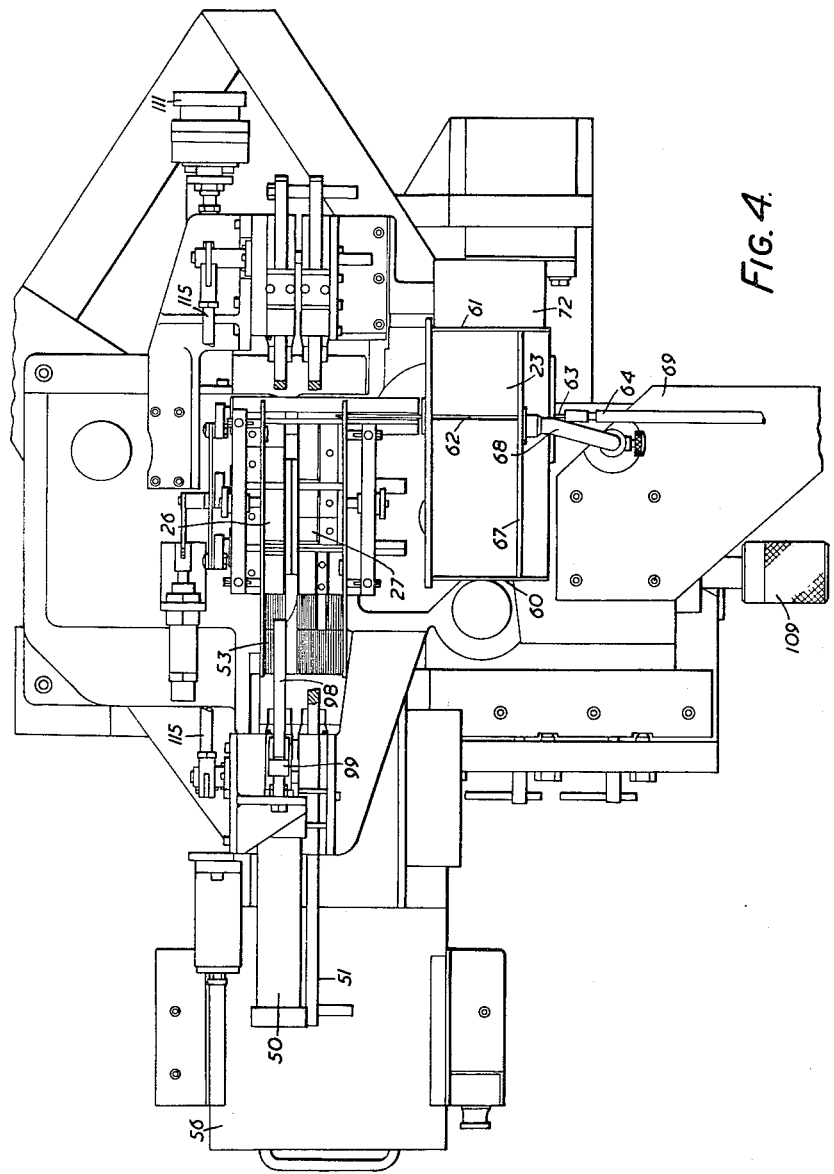
FIGURE 4 is a plan view of the upper part of the apparatus shown in FIGURES 2 and 3.
Figure 5:
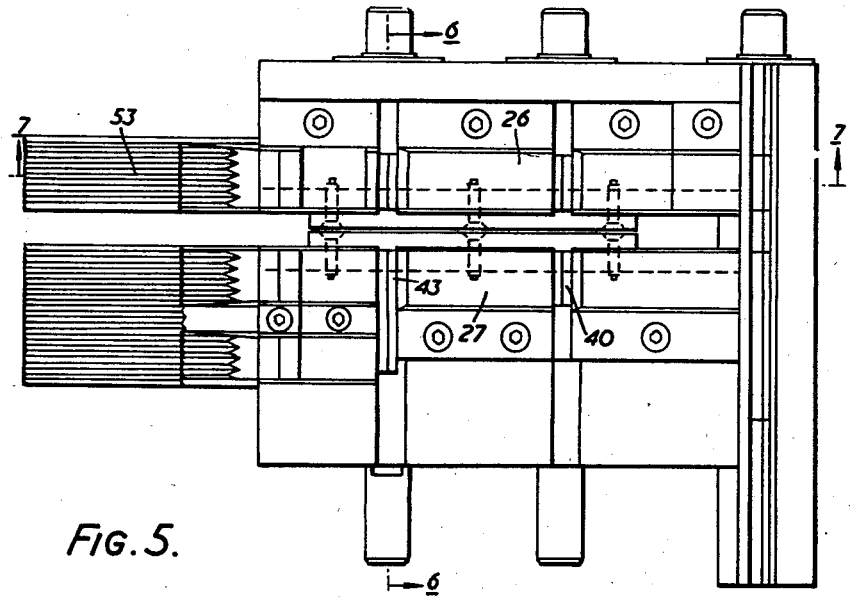
FIGURE 5 is a fragmentary plan view of the test bed part of the apparatus, shown in FIGURE 4.
Figure 6:
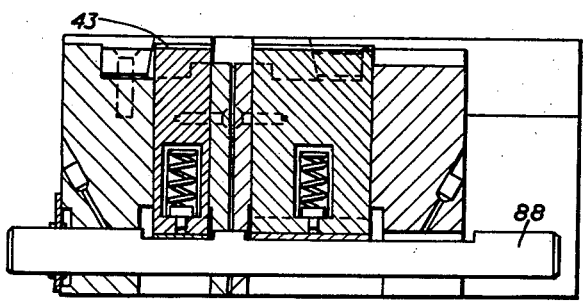
FIGURE 6 is a section taken on the line 6—6 of FIGURE 5.
Figure 7:
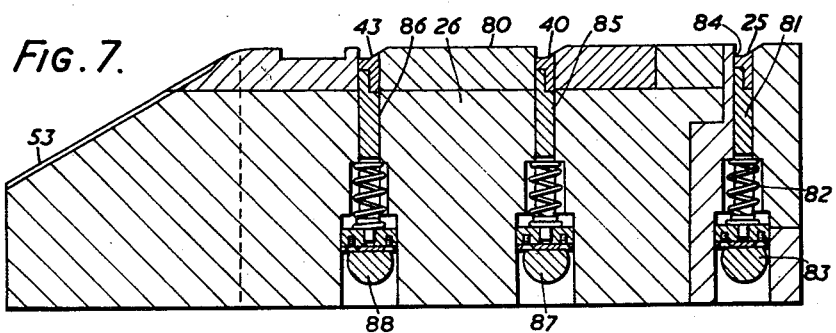
FIGURE 7 is a section taken on line 7—7 of FIGURE 5.

The drive plates 34 and 35 (see FIGURES 2 and 3) are reciprocated by a mechanism which includes an air cylinder 50 which drives a reciprocating bar 51 to which the plates 34 and 35 are attached; it is arranged that the forward stroke of the ram of the air cylinder during which the drill bits are gauged, is relatively slow, the return stroke being more rapid.

When the drill bit being tested passes beneath shoe 37, a voltage output is derived from transducer 38 in the manner described above; this voltage is effectively recorded upon a magnetic drum in a mechanism which is indicated generally at 52. When the same bit passes beneath shoe 41, and a second output voltage derived from transducer 42, the second voltage thus derived is recorded upon the drum and after a short delay is compared with the first voltage derived from the transducer 38 and previously recorded upon the drum. The two voltages can thus be compared so as to ascertain whether the drill is within the set tolerances on taper, or whether it is to be rejected. Also, the voltage derived from the transducer 42 is recorded on the drum of mechanism 52, so that when the same drill passes beneath shoe 44, and a voltage obtained from transducer 45 in similar manner, this too can be compared with the previous measurements of the drill bit, to decide whether it is to be accepted or rejected on taper.

After having been tested in this way, the drill bit rolls down an inclined surface indicated at 53, over control flaps 54, 55. By these flaps, the operation of which is controlled from the result of the gauging of the bit, the bit is deflected to one of a number of chutes and hence to containers indicated at 56, 57, 58 and 59. For example, container 56 can be used for drill bits that are "too-small," 57 for bits that are "too-large" and containers 58 and 59 for bits that are "acceptable." Drill bits that are too large and which are delivered to container 57 can be reground for further measurement and those which are too small and are delivered to container 56 can be reground for use as a smaller diameter bit, so that they are not uselessly rejected.

Referring now to FIGURES 3, 10, 11 and 12, the hopper 23 has converging side walls 60, 61, which lead to an aperture indicated at 62. Aperture 62 is in alignment with the groove 25, and a bit which falls by gravity to the bottom of the hopper is pushed by a push rod 63 from the bottom of the hopper into the groove. Push rod 63 is carried upon an actuator 64, and is spring loaded by a compression spring 65, the reciprocation of this part being effected by means of an air cylinder assembly indicated generally at 66. For loading the hopper with bits, one wall 67 is made removable, being carried by an arm 68 supported upon a plate 69 forming a part of the main structure of the apparatus. An air operated vibrator assembly 71 is used to tap the side of the hopper after each motion of the push rod 63, to ensure that the drill bits will drop by gravity to the bottom of the hopper. Assembly 71 includes a spring loaded piston 72, air being fed to one side of the piston, thereby to drive a rod 73 against a tapping plate 74 on the side of the hopper. One wall 61 of the hopper is adjustably mounted by means of a milled screw 75 upon the support plate 69, so that the hopper can be adjusted for drill bits of different diameter. Alignment of the hopper with the aperture leading to the groove 25 is effected by means of a milled screw 76, which moves the other side of the hopper bodily across the guide plate. In this way it is ensured that the bit will be fed precisely into the centre of groove 25.

The arrangement of the test bed 26, 27 and the grooves 25, 40 and 43, is shown more clearly in FIGURES 3 to 7. As appears more clearly from FIGURE 7, test bed 26, which is formed in a way similar to test bed 27, comprises an upper surfacing member 80, of hardened steel, in which the grooves 24, 40 and 43 are located. The base of groove 25 is provided by means of a vertical slide member 81, biased to a downward position by means of a compression spring 82, and movable in the upward direction by means of a cam 83, which is actuated by the crank member 31. When crank member 31 is moved by means of the cylinder 28 and ram 30 in the manner described above, the surface 84 of the slide is brought level with the upper surface of the member 80, so that the drill bit resting in the groove formed by the slide in its lower position is free to roll onto the upper surface of member 80, under the action of the drive plate 34. In a similar way, slides 85 and 86 are used for the bottoms of grooves 40 and 43 and are driven by cranks 32 and 33, as described above. The cranks are mounted directly on the cam shafts 87 and 88. The drive plates 34 and 35 are carried upon the bar assembly 51, as described above. The drive plates are mounted by means of pins 90, 91 which pass through apertures in the bar assembly, and are biased downwardly by means of compression springs 92, 93. The bar assembly 51 is carried in a bearing surface in a main support 95 at one side of the apparatus, and in a support 96 at the opposite end. The operating cylinder 50 is also mounted upon the member 95, and is coupled to the bar assembly by a coupling consisting of a pin and slot arrangement 97 which ensured that the bar assembly reciprocates without any transverse load being imposed upon it. A device consisting of a bar 98 and a runner 99 is also employed to steady the free end of the ram of the operating cylinder, thus ensuring parallel movement of the pin of the device 97.

Figure 8:
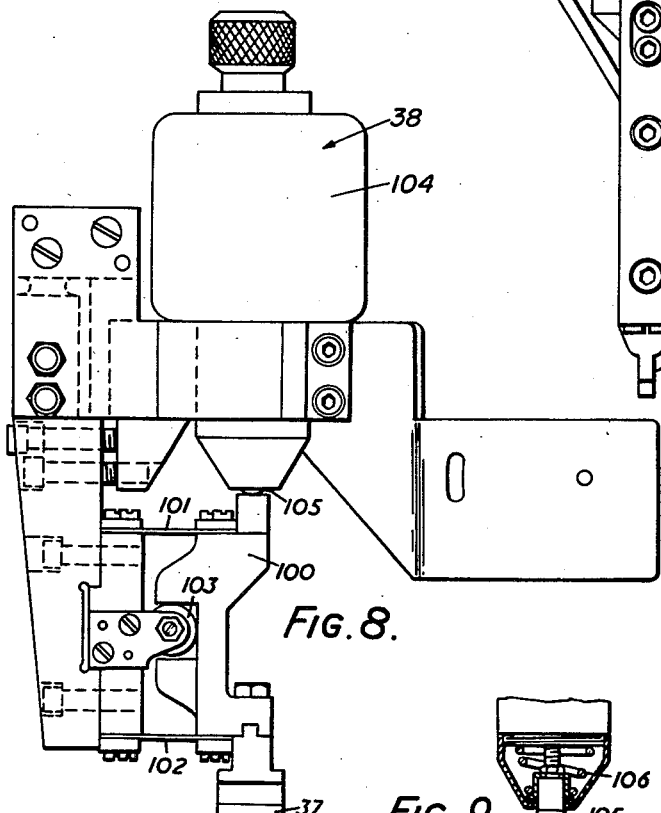
FIGURE 8 is a side elevation of part of one of the gauging devices.
Figure 9:
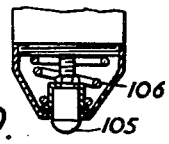
FIGURE 9 is a fragmentary view of part of the bottom end of the transducer of FIGURE 8.
Figure 11:
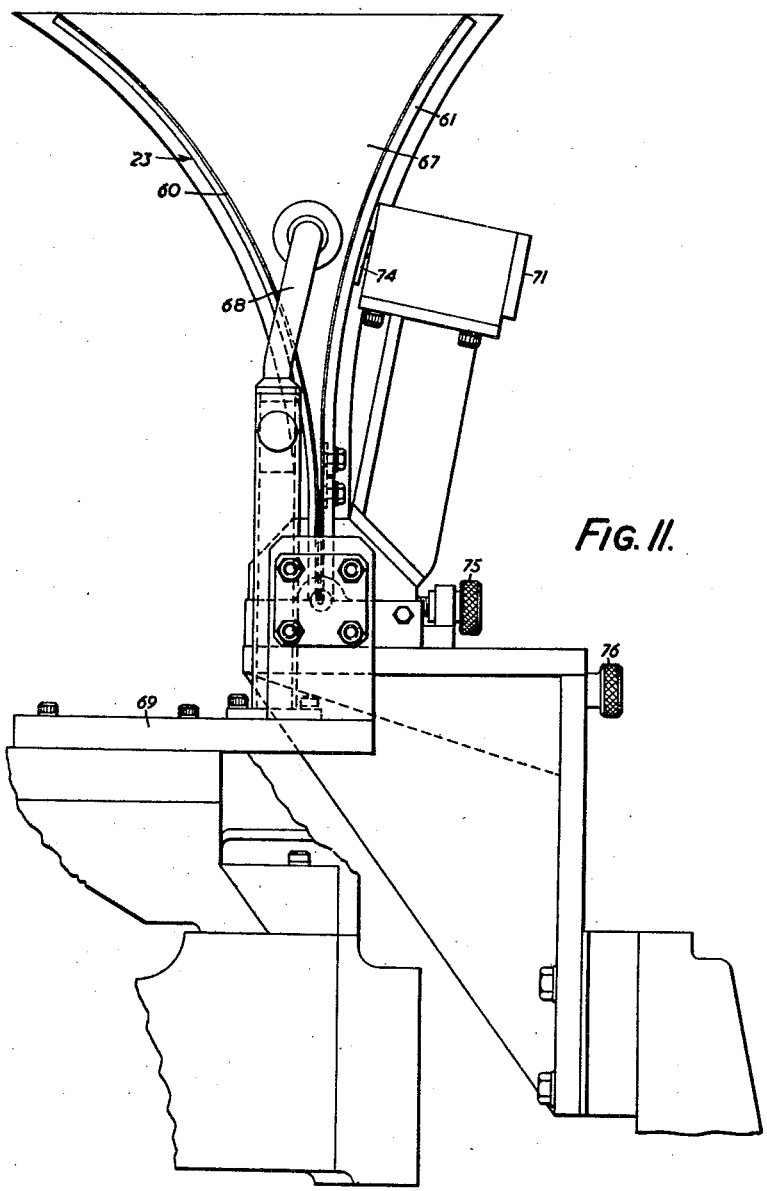
FIGURE 11 is a fragmentary side elevation of part of the drill bit hopper device.
Figure 12:
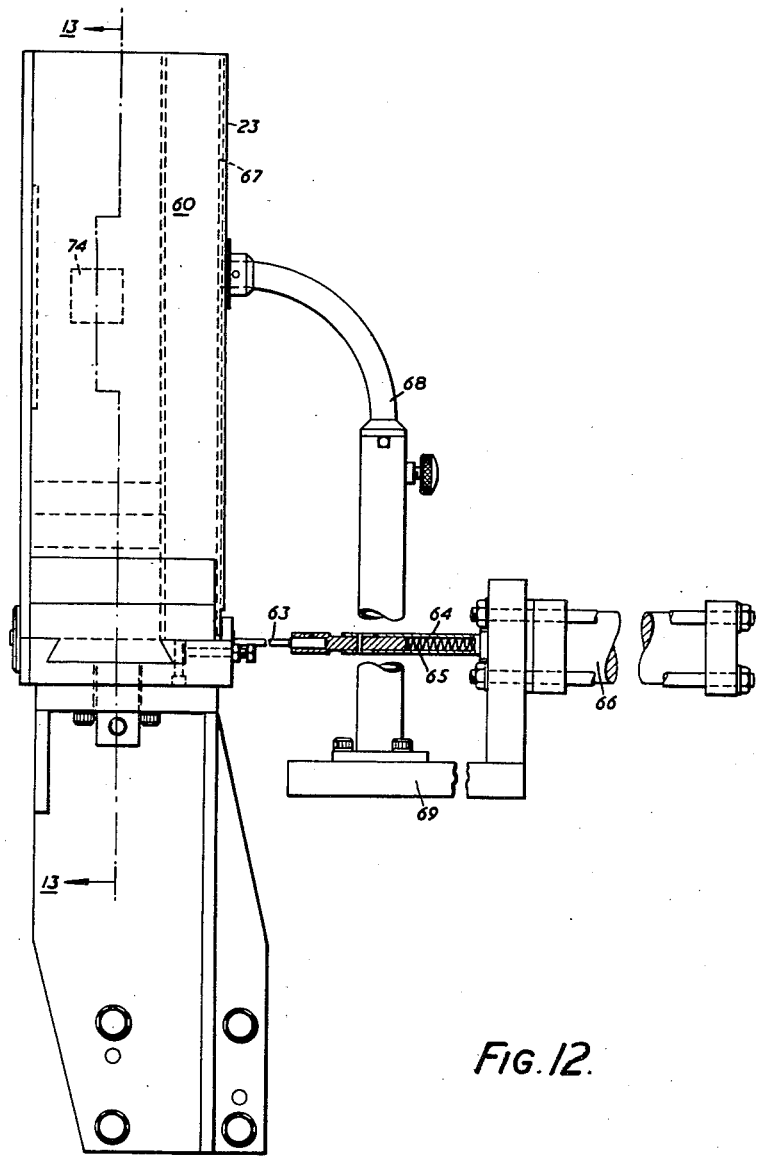
FIGURE 12 is a front elevation of the parts of the apparatus shown in FIGURE 11.

A gauging shoe and the associated part of the transducer are shown in FIGURES 8 and 9. Shoe 37, for example, is mounted upon a carrier 100, carried from a stationary part of the apparatus by means of two parallel flat spring members 101, 102. The travel of the shoe 37 in the vertical direction is minute, and the arrangement of springs 101 and 102 ensures that these move within a truly vertical and parallel way. Preferably, the two springs are designed to have a different resonance period, for example, by being made of different thickness material, so as to reduce bounce when the drill rolls beneath the shoe. The springs 101, 102 serve also to bias the carrier 100 downwardly, so that a stop position eccentric roller 103 bears against the upper surface of a slot formed in the carrier 100, in the manner shown in FIGURE 8. This provides an upward limit stop for the shoe 37.

The transducer comprises a member 104, which in this particular embodiment consists of a magnetic type transducer, with an armature of ferro-magnetic material and stationary inductively coupled coils which form two arms of a bridge circuit energised with alternating current. The potential at the junction of the coils is compared with the potential in the other arms of the bridge. When the armature is in its means position, the output voltage across the one diagonal of the bridge will be zero, but when the armature is moved an output is obtained that is a function both of the sense and extent of movement of the armature; a device of this kind is known per se and does not require further description here, except to point out that the energising current fed to the stationary coils is of relatively high frequency, of the order of 10 kcs./sec. This high frequency is of considerable importance, as will be apparent hereinafter. The transducer includes a sensitive stud 105, the motion of which is coupled to the armature of the transducer. To reduce bounce of the stud 105 as the drill bit is rolled beneath the shoe, the stud is loaded by an aperiodic spring 106, indicated in FIGURE 9. The complete transducer is carried upon a robust support arm 107, firmly supported upon the main body of the apparatus. The three transducers 38, 42 and 45 are all similar in construction, and the associated gauging shoes are similarly mounted with respect to them. Preferably all these measuring parts are made of mamterials having relatively small temperature coefficients of expansion.

The apparatus described is adjustable for use with drill bits of both different lengths and different diameters. To permit drills of different length to be accommodated, the end wall 67 of the hopper, besides being movable, as described above, is also adjustable to vary the effective width of the hopper. Variations necessary in the stroke of the push rod 68 will be taken up automatically in the movement of the air cylinder 66; in each case the bits are advanced until they strike a stop at the end of groove 24.

Also, the test bed 27 is arranged to be movable to and from the test bed 26, the shoes 41 and 44 and transducers 42 and 45 being moved also with the bed 27 when it moves in this way. For this purpose these parts are arranged as a unitary structure which can be slid over the support surface 108. This movement of the unitary structure can be effected by means of a knurled knob 109 (FIGURE 4), which drives a threaded shaft 110 (FIGURE 3), connected at one art of a stationary part of the apparatus and at the other to the unitary structure.

To enable drill bits of different diameters to be accommodated, the operating level of bar assembly 51 is varied. For this purpose the bar assembly is carried adjustably in fixed supports 95 and 96. A control knob 111 operates a lever 112, fixed to a lifting cam at 113. Cam 113 is coupled to a further cam 114, on support 95, by means of a connecting rod 115, pivoted to a lever 116 which operates cam 114. When the knob 111 is turned, the two cams 113 and 114 are rotated through a small angle, and these are arranged to lift the bar assembly 51, and thus to alter the height of the drive plates 34 and 35 above the level of the test bed 26, 27. The transducers are provided with individual micrometer control knobs by which they can be released and re-adjusted in the position corresponding to the required new diameter of the drill bits.

Figure 16:
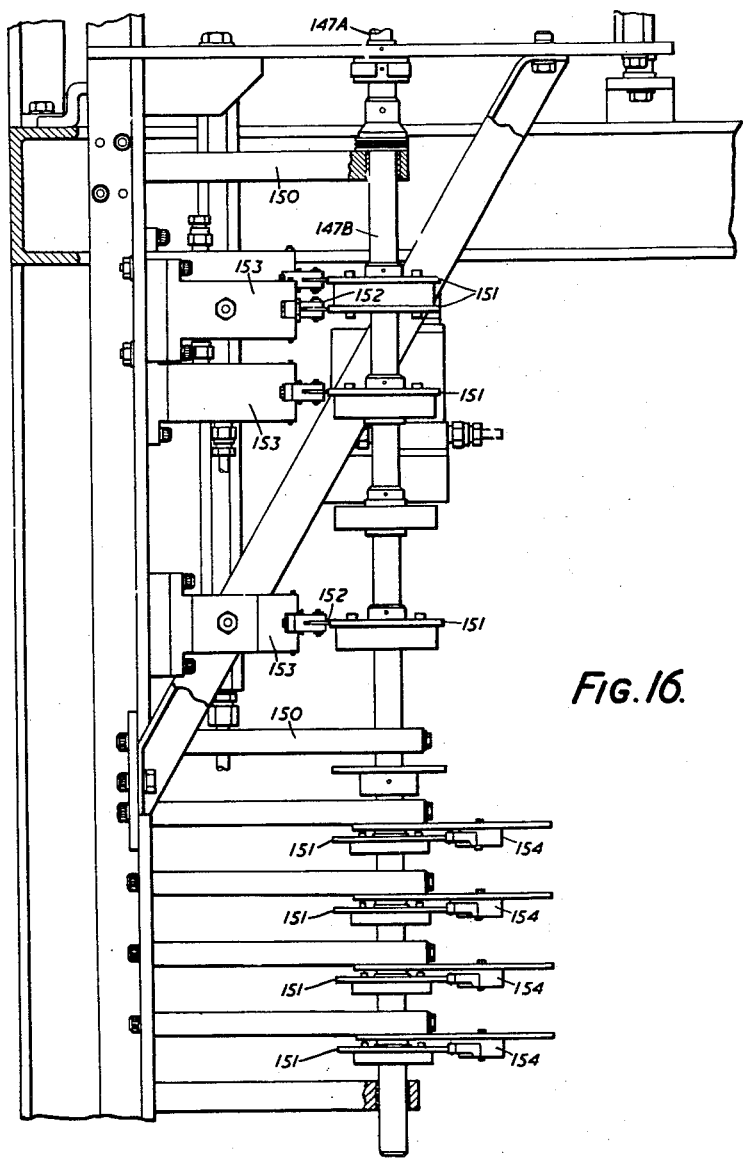
FIGURE 16 is a side elevational view, partly in section, of the cam shaft arrangement.

As explained above, the drill bits after test are rolled down the surface 53, and are directed to one of the containers 56 to 59, in accordance with the results of the gauging measurements. The arrangement of surface 53 and the deflecting flaps 54 and 55 are shown more clearly in FIGURES 16 and 17. Flap 54 is pivoted upon a shaft 120, and flap 55 upon a shaft 121, extending across and beneath the deflector surface 53. The shafts 120 and 121 pass between a pair of plates 122 and 123, and on their parts which extend beyond plate 123 have secured to them respectively actuating arms 124 and 125. The flaps are biased to the position in which they are closed against the surface 53 by means of tension springs 126, 127 which engage the free ends of arms 124 and 125. The upper ends of arms 124 and 125 are connected to the armatures of actuating solenoids 128 and 129. It will be understood that these solenoids are controlled in accordance with the results of the gauging operation in the manner described briefly above.

If as a result of the actuation of solenoid 128 the flap 54 is raised, the drill bit passing down surface 53 will be deflected into a passageway 130, leading to one of the containers 58 or 59. Similarly, if flap 54 is not raised but flap 55 is raised the drill bit will pass to a passageway 131 leading to a further container 57; if neither flap is operated the drill bit will pass directly down the surface to another of the containers 56. In practice, it occurs that the majority of bits are not rejected and so two containers 58 and 59 are provided for satisfactory bits, these being filled in turn by the accepted drill bits. In this way the gauging machine can be run continuously, and each container 58 or 59 removed as it becomes filled with bits and an empty container placed in its place. It is convenient to control entry into containers 58 and 59 by a counter-batcher unit, which is preset to change over when one of these said containers is full.

Associated with each of the transducers 38, 42 and 45 is electronic equipment. This will include an oscillator of appropriate frequency for exciting the transducer, and means responding to the out-of-balance voltage induced in the bridge circuit including the coils of the transducer in accordance with the movement of the sensitive stud 105; the output voltage from the bridge circuit will be of the same frequency as the exciting voltage. Means are provided also rectifying the output voltage and for establishing a direct current pulse voltage which is a function of the peak voltage that is derived from the transducer as the drill bit under test passes beneath the related test shoe. Owing to the speed at which the drill bit is rolled beneath each shoe, and the fact the lands on the bit occupy only a small angular extent of the periphery of the bit, it will occur that the land is beneath the shoe, extending it to its greatest separation from the test bed, for only a very short period of time. It is for this reason that the use of a high frequency to supply the transducer is important. If the frequency of energisation of the transducer were relatively low, for example 50 cycles per second, it would probably occur that the lands would be in contact with the test shoe for so short a period, less than half a cycle of alternation, that the correct peak voltage proportional to the diameter at the lands would not be derived from the transducer. With the high audio frequency mentioned above, in the machine described it occurs that the peak period will occupy at least a few cycles of the energising alternating current. This enables a reliable output voltage, proportional to the maximum bit diameter to be obtained. Although the transducer output voltage is thereby a reliable indication of drill bit diameter, it is inconveniently short in duration, and it is therefore preferred to feed the output voltage to a device that lengthens it; a pulse length of about 100 milliseconds is suitable. For a reason that will be referred to later, the pulses derived from the flute-end and shank measurements can be of lesser duration.

Figure 14:
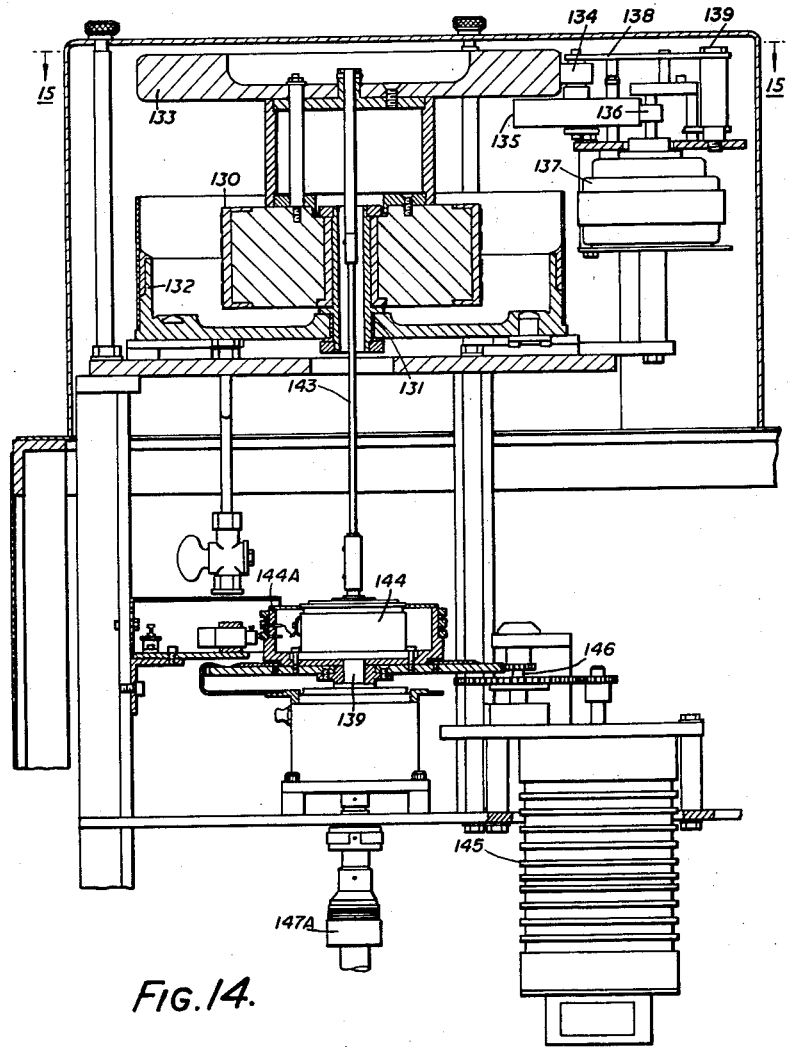
FIGURE 14 is a sectional view of the magnetic drum device and the upper part of the driving mechanism for the cam shaft.
Figure 15:
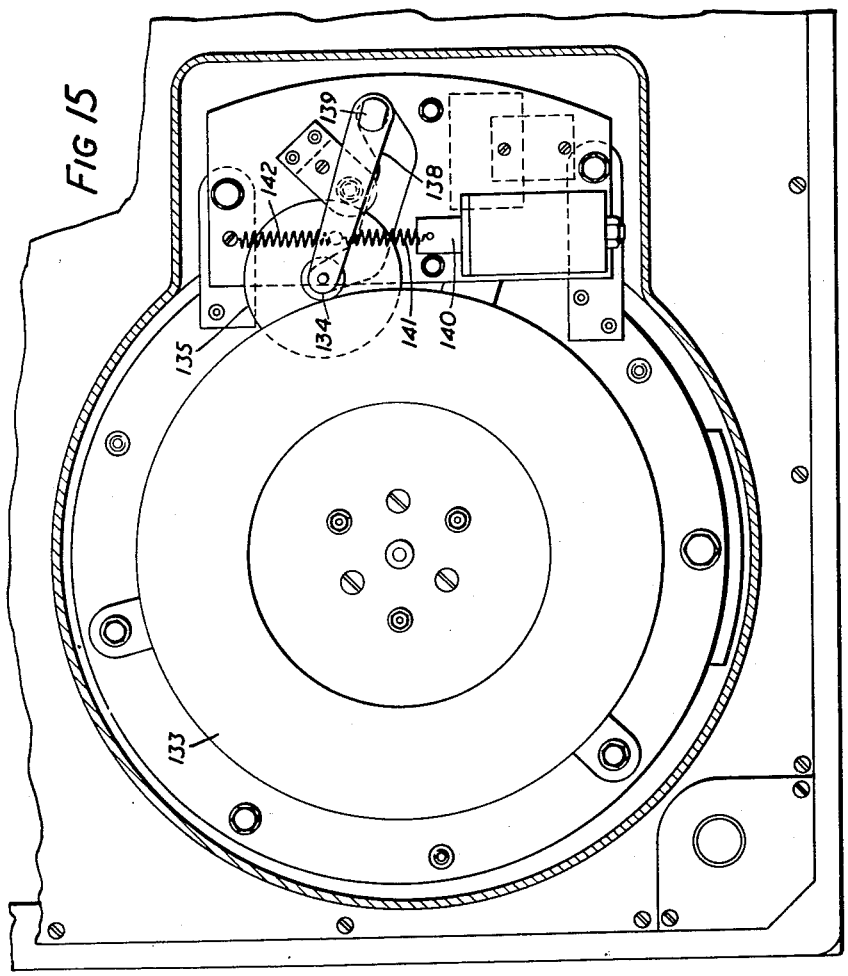
FIGURE 15 is a sectional view taken on the line 15—15 of FIGURE 14.

The voltage amplitude of the lengthened pulse remains proportional to drill bit diameter and this voltage is recorded upon a magnetic drum system, which is indicated in a somewhat simplified manner in FIGURES 14 and 15. The magnetic drum 130 is journalled at 131 in the base of an oil bath 132; the oil in the bath is chosen to have a constant viscosity, and thus not only acts to damp out any irregularities of movement of the drum and assist in driving it at a strictly uniform speed, but also serves to provide a constant spacing between the magnetic surface of the drum and the record, play back heads and erase heads. These measures are desirable to ensure that the voltages derived from the drum are accurately related to the transducer output voltage. The drum is connected at its upper part to a heavy flywheel member 133, the periphery of which is driven by friction roller 134; carried on a two-step jockey pulley 135. Jockey pulley 135 is in turn driven by means of a friction roller 136 mounted upon the shaft of a synchronous motor 137. The jockey pulley 135 is mounted upon an arm 138 pivoted at 139, and movable into engagement with the periphery of the flywheel 33 under control of an actuating solenoid 140, through the intermediary of a tension spring 141. When solenoid 140 is de-energised, a pull-off spring 142 withdraws the jockey pulley from engagement with the periphery of the flywheel, thus avoiding the development of flat surfaces upon the periphery of the friction surfaces of the jockey pulley and the pulley 135, which could with age cause drum-speed variations.

It will be apparent that the motion of the magnetic drum 130 must be accurately synchronised with the cycle of operation of the rest of the machine, including the reciprocation of the push rod 68, the actuating cylinder 28 and the actuating cylinder 50. The flaps 53 and 54 must also be operated at the appropriate time.

To enable the desired synchronism to be obtained, the various air operating devices and the operating solenoids are controlled by means of a cam shaft assembly driven synchronously with the flywheel 133. This includes an assembly which is shown more particularly in FIGURE 14.

It is necessary that the magnetic drum 130 should be driven at very accurate speed and free from fluctuations in order that, as mentioned above, the voltage which is picked off from the magnetic drum shall be very accurately proportional to the voltage which was recorded upon it as a magnetic variation. Any short-term variation in the speed of the drum would produce a change in the read-off output voltage, and this would impair the accuracy of the gauging which is taking place and correct rejection of over size or under size drill bits, could not be achieved. Accordingly, whilst the magnetic drum 130 is coupled to the cam shaft assembly, it is arranged that this is effected without substantial load on the flywheel 133, or feedback to it from the cam shaft assembly by means of a servo system.

Coupled to flywheel 133 is a flexible drive shaft 143, in turn coupled to an angular error servo generator 144. The servo generator 144 with slip rings 144a, is connected to a servo-amplifier (not shown in FIGURE 14) which in turn is used to control the speed of rotation of an actuating motor 145. This motor, through a train of gears indicated generally at 146, drives an output cam shaft 147A in exact synchronism with the flexible drive 134, and hence with the flywheel 133. The cam shaft and its mounting is shown more clearly in FIGURE 16. The lower part of cam shaft 147B is mounted in a series of bearers 150; between the bearers the shaft carries cams 151. Cams 151 have cam followers 152 which control air valves 153; and in turn, valves 153 control the supply of compressed air to the actuating cylinders.

Similarly, some of the cams 151 with their cam followers, control electric switches 154, which serve to control the electrically operated parts, such as solenoids 128, 129 and 140; the way in which this is done is referred to hereinafter. This control of the electrically operated parts includes not only direct actuation, but in some cases the preparation of circuits for subsequent operation, or inhibition of operation of some circuits until the appropriate time in the cycle.

The operation of the apparatus described will be apparent from FIGURES 19A to 19F, which are functional diagrams. The three transducers 38, 42 and 45 are connected to their associated electronic equipment, indicated diagrammatically at 200, 201 and 202. Apparatus suitable for this purpose is available commercially, and need not be further described here. The electronic apparatus includes indicators, from which a direct indication, in linear dimensions, can be obtained of the result of the gauging by shoes 37, 41 and 44 though with the apparatus available commerically this indication can be obtained only at low speed. When the machine is used at operating speed the indicating meters are switched off and only very short duration electrical pulses (of the order of milliseconds) are generated by the rolling passage of the drill bits. The amplitude of these pulses is proportional to the maximum diameter of the drill bits at the point along the drill bit measured. It may be that the insertion in the apparatus of a drill bit which is of a greater diameter by several mils than that for which the machine is set up will result in damage, and if this is likely an oversize detector can be incorporated, consisting of a simple shoe and associated microswitch 203, located so as to be operated by such an oversize drill bit when it is impelled through the input opening 62 by the push rod 63.

As is mentioned above, the equipments such as 200, 201 and 202 will operate to produce a high frequency energy which feeds the transducers 38, 42 and 45. The out-of-balance signal voltage from the transducers is amplified and then de-modulated to give a D.C. pulse voltage which is a function of the gauging by shoes 37, 41 and 44. The demodulated direct current pulse outputs of equipments 200, 201 and 202 are applied respectively to low pass filters 204, 205, 206, to eliminate as far as possible any high frequency components of the pulse-signals and the filter outputs are applied respectively to amplifying stages 207, 208 and 209. As is explained above, the outputs of the equipments 204, 205 and 206 will consist of short pulses, corresponding to the passage beneath the test shoes of cutting edge of the bit being tested. The outputs of the units 207, 208 and 209 will therefore consist of short signal pulses, of substantially direct current; for the reasons mentioned above these pulses will be of very short duration and they are therefore applied to pulse lengtheners 210, 211, 212 respectively which increase the pulse lengths from milliseconds to some 5–100 m. seconds duration if required but without affecting pulse amplitude which still carries the drill dimension information in an analogue voltage form.

As mentioned above, the duration of the pulse representing the tip diameter is in this form of the invention, about 100 ms., but shorter pulse lengths, of about 10–20 ms. duration, are used for the other dimensions. This enables the tip diameter information to be available for comparison with the later made measurements, since thereby the pulses will coexist in time, whilst they are being read out from the magnetic drum. Once used, the magnetic record is erased in known manner.

It is desirable that recording of this analogue voltage on a magnetic memory device should take place at a frequency in the middle of the audio range, since it is at this frequency that the most effective read-out can be obtained. Accordingly, the outputs of the pulse lengthening devices 210, 211 and 212 are applied to 1000 c./s. oscillators 213, 214 and 215 and the outputs of oscillators 213 and 214, at amplitudes which will be a function of the amplitudes of the outputs of the pulse lengtheners 200 and 201, are recorded upon drum 130 by means of recording heads 216 and 217 respectively. Supersonic bias is used, in known manner, and a bias oscillator 218 is provided, feeding the recording heads 216 and 217 through feed resistors 219 and 220 and associated with supersonic rejectors 221 and 222.

It is not necessary that the output of the transducer 45, which is the measurement of the end of the shank of the drill, should be recorded, but it is possible for this to be done if desired, in order to more nearly standardise the various parts of the equipment.

The recording head 216 carrying the tip diameter information is advanced 240° with respect to its read-off head 223, thus holding the analogue voltage information relating to the tip diameter coming as a pulse from unit 210 for 2 seconds (in the case described where one revolution of the drum, i.e. 360° corresponds to 3 seconds). This time delay is to allow the drill bit whose tip diameter has been measured to move through the other measuring stages 41 and 44 in the gauging machine before reaching the selector flaps 54 and 55 leading to the bins 56, 57, 58 and 59 which in turn are operated by the logical decisions derived from comparing the drill tip diameter with the flute-end and the shank-end diameter information respectively.

For the same reason the recording head 217 carrying the flute-end diameter information is advanced 120° with respect to its read-off head 224 thus holding the analogue voltage information relating to flute-end diameter for 1 second. These angular displacements of the heads enable all the three measured dimensions of the drill bit to be read off simultaneously into a simple analogue computer, (shown as "discrimination units" 241, 242 and 243 in FIGURE 19D), from which are derived the logical decisions as to whether a drill bit has the correct dimensions and taper and be accepted as "good" or is to be rejected as over-size (on any dimension) or under-size (on any dimension) according to the interdependent dimensional limits set up in the "discriminator units," as will be described later.

Associated with the track produced by recording head 216 is a playback magnetic head 223, and a further playback head 224 is associated with the track produced by record head 217. The output of head 223 is applied through a constant gain selective 1000 c./s. amplifier stage 225, and then goes through a demodulator stage 226. In similar way, the output of head 224 is applied to a constant gain selective 1000 c./s. amplifier stage 227 and demodulator 228.

The output of the oscillator 215 need not be recorded upon the drum as the last measurement information can be used immediately without recording it upon the drum so the output is passed through an equalising network 229, simulating the electrical characteristics of recording and playback on the drum, to a constant gain amplifier stage 230 and demodulator 231.

The first dimensional information obtained from the tip diameter of the drill bit is in the form of a negative D.C. output voltage from demodulator unit 226. There is an additional equivalent positive D.C. output voltage produced at the same time from demodulator unit 232. The purpose of this positive voltage is to act as a reference voltage (carrying the tip diameter information) for comparison with the flute-end diameter information derived from unit 228 and the shank-end diameter information derived from unit 231. This will be explained in connection with the whole discrimination logical system of the gauging machine and the "accept" gate actuating solenoid 128 and "oversize" reject gate actuating solenoid 129. This discrimination logical action based on the comparison of voltage-analogues representing dimensions, takes place mainly in three discrimination units 241, 242 and 243. Discrimination unit 241 for deciding whether the tip dimension is too small, good, or too large functions in the following manner:

The tip diameter negative voltage information from unit 226 is compared in a balancing network 237 and 238 with a pre-fixed and constant positive D.C. voltage derived from potential divider 239 fed from a stable constant voltage source 235 and 236 in known manner. The discrimination unit 241, contains blocking oscillator type trigger units combined with hold-in relays shown as 244 (for "accept") and 245 (for "too-large") respectively.

These units can function in one of three ways, as follows: (1) If the negative D.C. tip diameter information emerging from unit 226 is too small with reference to the positive D.C. voltage preset on potential-divider 234, then both trigger units 244 and 245 remain mute, or inactive. This will ultimately have the effect of leaving both gate solenoids 128 and 129 inoperative and then the drill bit concerned will be rejected in the "too-small" duct (i.e. the surface 53) into the "small" reject bin 56. (2) If the tip diameter information voltage from unit 226 lies between the two internally present limits (set up on potentiometers 237 and 238) then the "accept" trigger unit 244 fires and locks in its associated relay. It will be seen later what effect this has on the "accept" gate actuating solenoid 128. (3) The third possible function of the discriminator unit can be understood if it is supposed that tip diameter information voltage from unit 226 lies above the uppermost present limit (set up on potentiometer 238; then it is obviously also above the limit set on potentiometer 237). In this case both trigger devices 244 and 245 lock in both associated hold-in relays.

Both the associated output relays make contacts 246 and 247 are both closed and this is arranged to operate "oversize" reject solenoid 129, but not the "accept" solenoid 128. The drill bit will now roll past the closed "accept" gate 54, and find "oversize" reject gate 55 (FIGURE 16) open. This permits the drill bit to be rejected into the "over-size" bin 57. The drill flute-end diameter discriminator channel-unit 242 works in a similar manner to unit 241; with the exception that the negative D.C. diameter information voltage emerging from unit 228 is now compared, not with a fixed present positive voltage such as 239, but is compared with a positive voltage dependent on the actual tip diameter of the bit. The latter derived from unit 232 is passed through equalising network 233 to limit selector potentiometers in unit 248, in which the trigger limits are set up on potentiometers (in a similar manner to that described above with respect to potentiometers 237 and 238) and which enable the flute-end diameter to be compared on a proper basis with the tip diameter of the same drill bit. This ascertains whether the drill bit has the prescribed taper, as explained above. The flute-end diameter discriminator unit 242 includes blocking oscillator triggers 254, 255 with relay contacts 256 and 257 corresponding in function to triggers 244 and 245 and relay contacts 246 and 247 respectively.

Also, shank-end diameter discriminator unit 243 includes blocking oscillator triggers 264, 265 with relay contacts 266 and 267 corresponding in function to the triggers 244 and 245 and relay contacts 246 and 247 respectively.

In the case of discriminator unit 143 function of comparison between the actual shank-end diameter negative D.C. voltage derived from unit 231 is compared in limit selector potentiometer unit 249 with a positive voltage, which is a function of tip end diameter coming from unit 232 through equalising network 234. The purpose of the equalising networks 235 and 234 is primarily an engineering convenience in the particular embodiment of this invention described. In this machine the end measurement takes place at a sensitivity level 4 times lower than the tip end measurement and hence the comparison voltage from the tip end dimension 232 has to be attenuated 4:1 before applying it to the limit selector unit 249; also the flute-end measurement takes place at a sensitivity level half of the tip end measurement and hence the comparison voltage from the tip end dimension 232 has to be attenuated 2:1 before applying it to the limit selector unit 248. Thereby the discriminator logic in units 241, 242 and 243 produce the required "accept" signals to be applied to the "accept" gate 54 when the drill bit has the correct taper specification. For convenience these taper comparison pre-set potentiometer circuit 233 234, 248 and 249 are all housed in one unit 240.

The purpose of stud switches shown on units 248 and 249, which in actual practice are ganged switches, is to enable different taper limits to be set up for different lengths of drill bits.

The operation of the gauge solenoids 128 and 129 will now be considered.

With the contact switching logic system comprising contacts 246, 247, 256, 257, 266 and 267 the following permutations of contact operations are possible.

If all and only if all drill bit diameters are "good" do contacts 246-256 and 266 make at the same time. These operate over conducting leads 268 and 269 a gate-hold relay in the hold relay box 270 which in turn operates the "accept" gate actuating solenoid 128 and this permits the acceptable drill bit to fall into the good bins through "accept" gate 54.

If any of the above mentioned contacts 246, or 256 or 257 remain inoperative, then there is no conducting path from lead 268 to 269 and the gate hold relays in box 270 remain inactive. In this case the drill bit measured cannot get through either "accept" gate 54 or "oversize" gate 55 and it will continue to roll along surface 53 into the "undersize" reject bin 55. If any of the relay contacts 247 or 257 or 267 operates, then this indicates that at least one of the drill bit dimensions is too large, and any of these occurrences will connect conductor 271 and 268, and energises the appropriate gate-hold relay in hold relay box 270. Thus, any of these occurrences will energise the "oversize" gate actuating solenoid 129 but is arranged to leave the "accept" gate actuating solenoid 128 unoperated. This is done by the well known arrangement of an "either" or "neither" connection, the condition "both" being excluded.

Cancelling microswitch 271 on cam 270 terminates the hold-relay box "hold-on" action and permits the gate solenoids 128, 129 to become de-energised, and the gates to close. The timing of cam 270, which has three lobes is such that this concellation occurs once per second after the passage of each drill bit through the selector-gate mechanism shown in FIGURE 16.

Similarly there is a comparison-logic cancelling microswitch 261 on three-lobe cam 260 which terminates the comparison logic action. Similarly this also occurs once per second and leaves the logic trigger circuits alert but un-fired awaiting the next group of dimensional information representing the three measurements from the next drill bit.

There is a further microswitch 251 on three-lobe cam 250 which serves to terminate once per second over zero-set unit 252 the dimensional information-pulses created in pulse-lengthener units 210–211 and 212, leaving these units conditioned to receive the next group of pulses.

Thus the whole system opens once per second in this particular embodiment of the invention, though this is only an example.

For larger sizes of drill the cycle of operation is preferably slower, as the actual speed is determined largely by the rolling perimeter of the drill bits. For small drill bits the operating rate can be higher than once per second as the rolling perimeter of small drills is shorter than that of large drills.

Figure 19B:
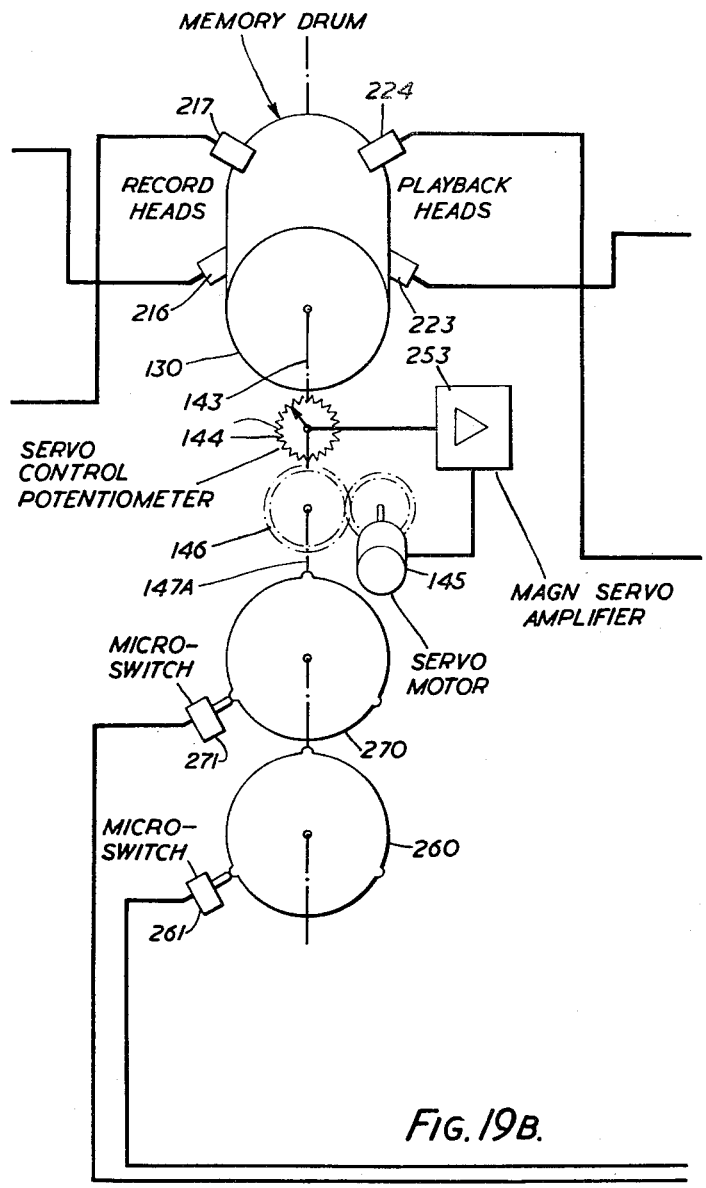
Figure 19C:
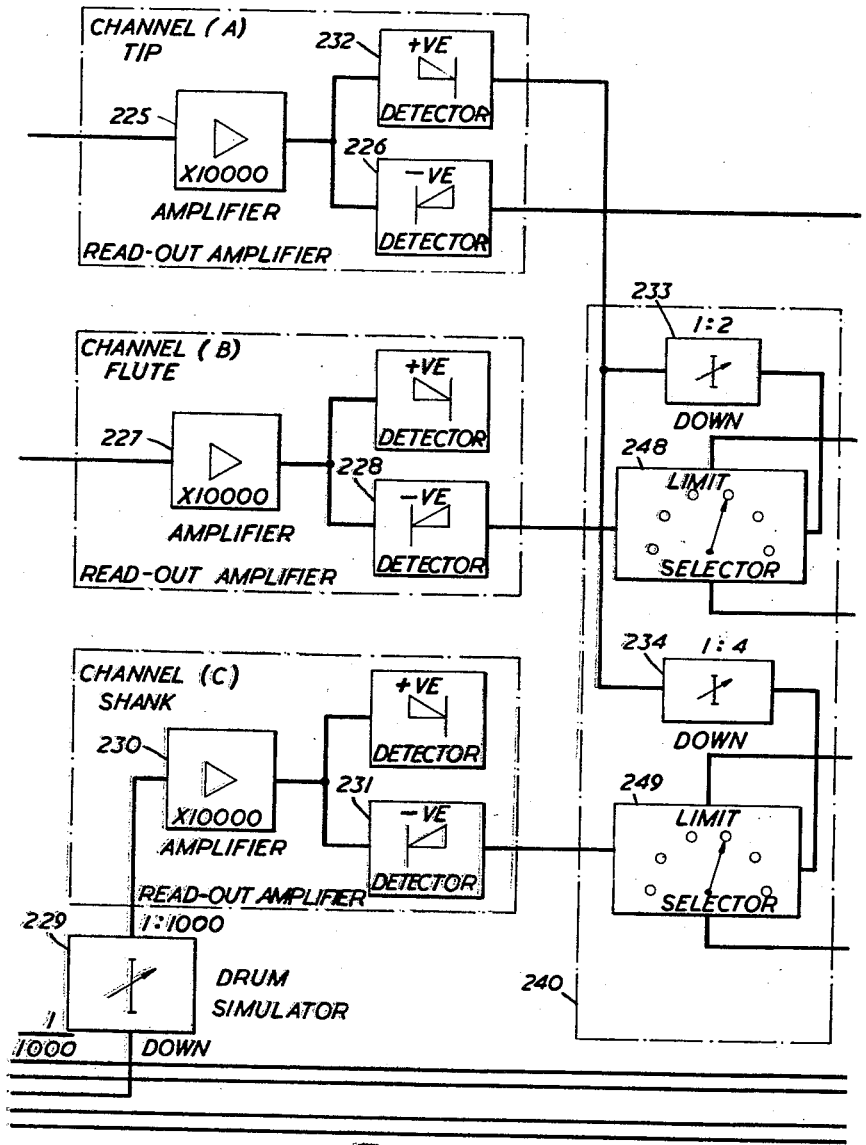
Figure 19D:
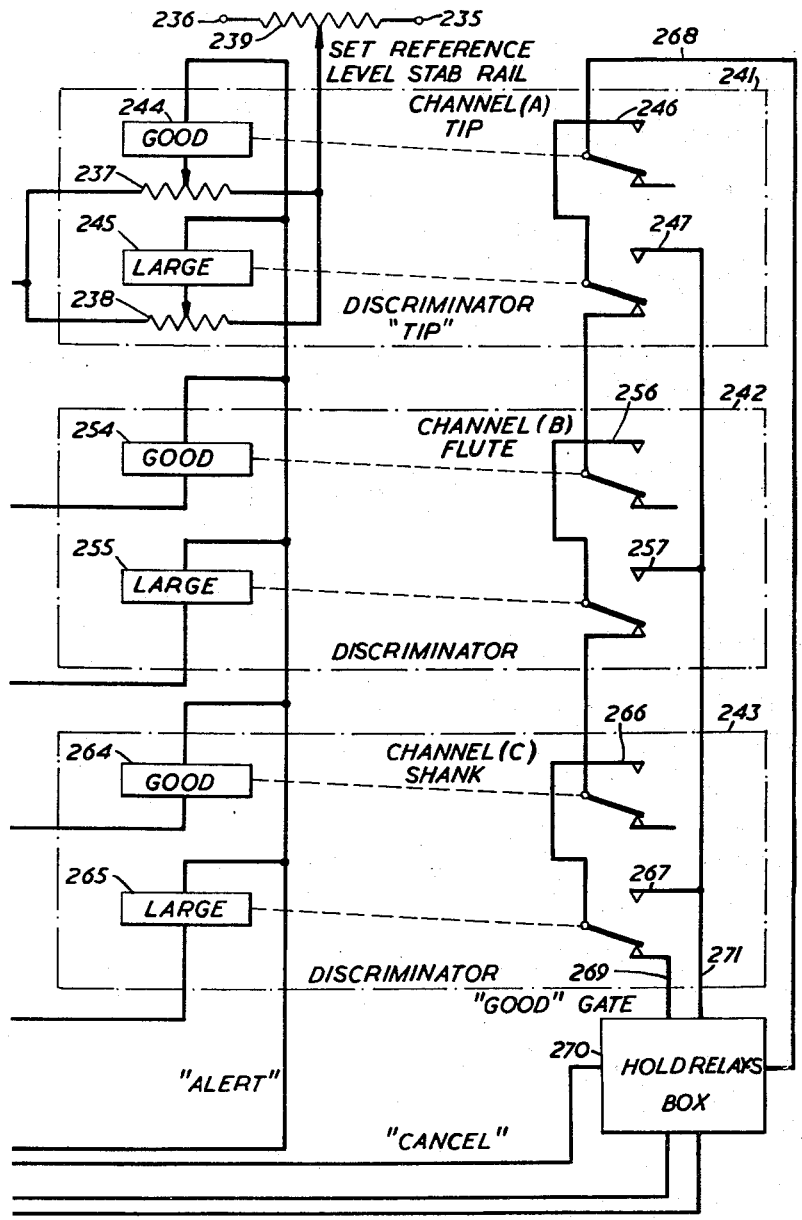
Figure 19E:
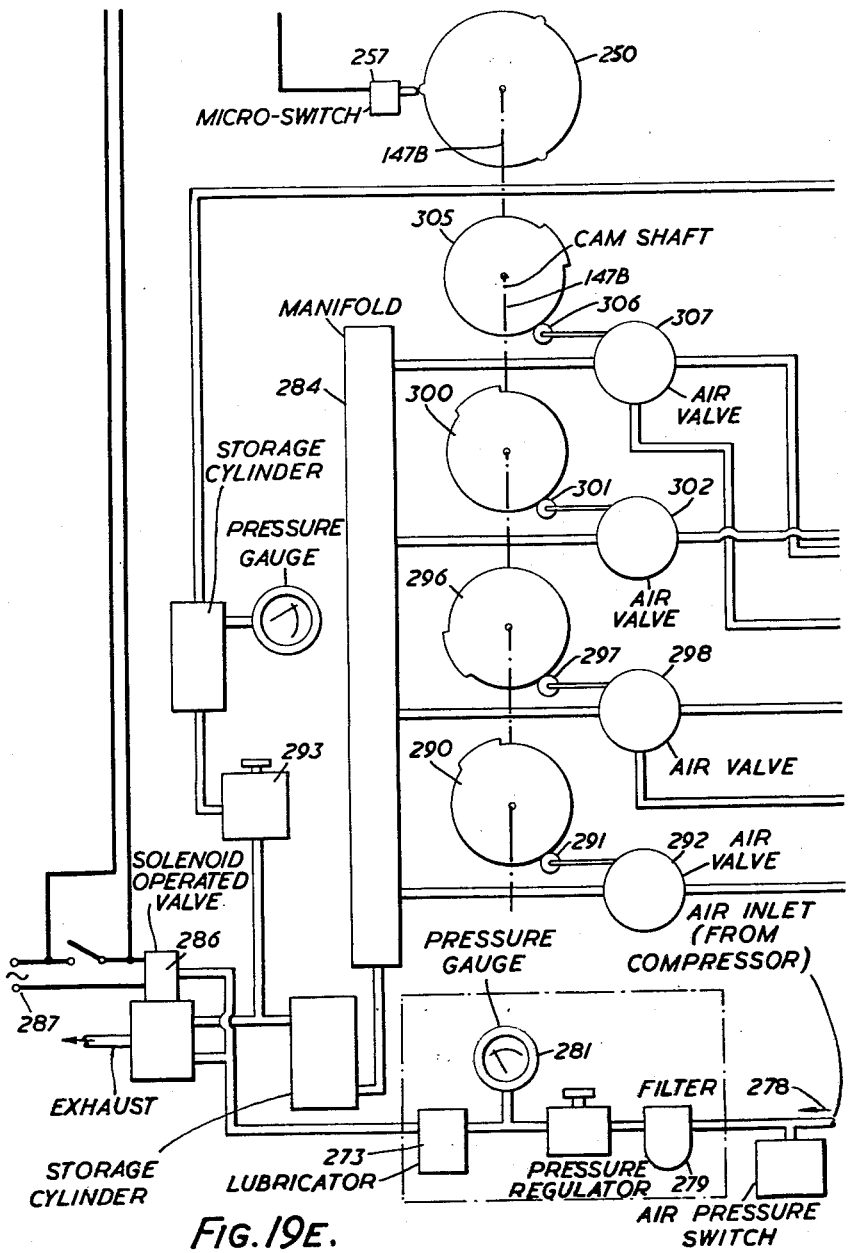
Figure 19F:
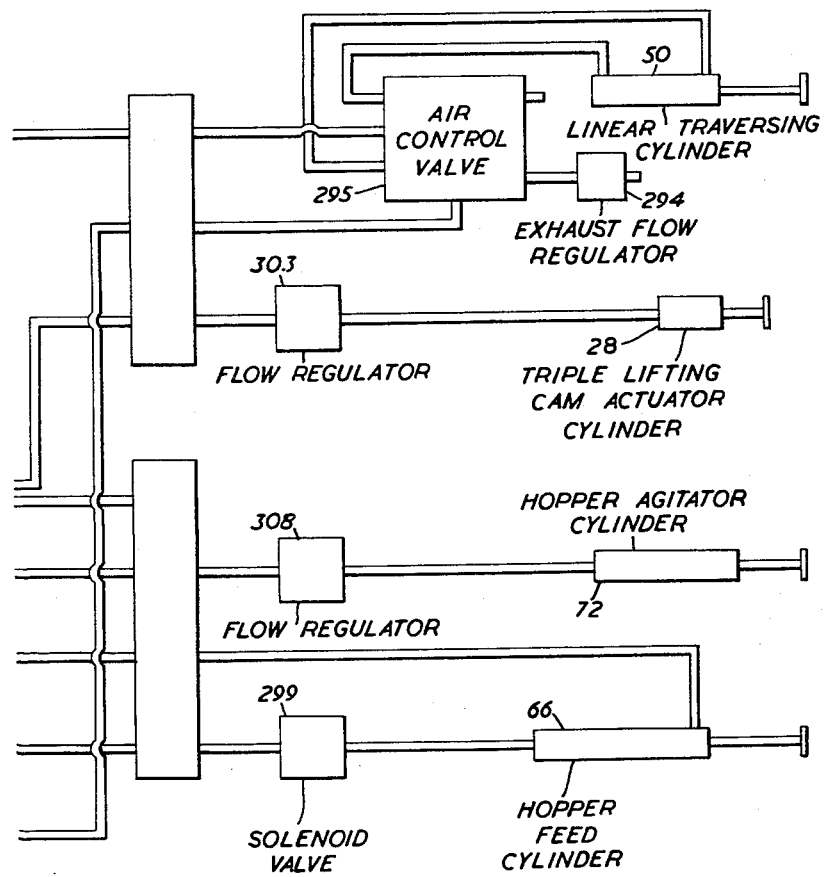

FIGURE 19B also shows in diagrammatic form the functioning of the mechanical parts of the apparatus. Thus, drum 130 is coupled to a cam switch 250, 260 and 270, which controls microswitches 251, 261, 271. 251 controls the zero setting of the pulse lengthening circuits 210, 211 and 212, by means of zero set devices 252.

The flexible drive shaft 143 drives a servo control potentiometer 144, and through a magnetic amplifier 253 controls a servo motor 145. Cam shaft 147B is thereby driven, in the manner described above.

Other known trigger devices can be used for discrimination such as gas-discharge trigger tube circuits. For the memory function described with reference to a magnetic drum other memory devices such as matrix memory circuits are usable, and need not be described specifically. The electrical cam switches would have similar roles to play, that of writing, cancelling and preparing the circuits to actuate. If no memory drum is used, the servo drive can be dispensed with.

The air system for the apparatus includes an air inlet 278, and an under pressure cut out switch 277, filter 279 and pressure regulator 280. The pressure gauge 281 can be provided. Associated with the air line is a lubricator 283, which feeds fine oil vapour into the air into a manifold 284, under the control of a main, electrically operated air control valve 285. The operating coil 286 of this valve is controlled from a main supply 287 through an inching switch 288, and through a lock-out provided by the over-size detector switch 203, whose function is to stop the air operated mechanism of the machine and prevent the machine jam-up.

Air passing through the control valve 285 passes to manifold 284 and its feed to the air actuators is then controlled by a series of valves 153 which are in turn controlled by series of three-lobe cams 151 on cam shaft 147B. Thus, a cam 290, with its cam follower 291, controls an air valve 292, in turn controlling the supply of air to the traversing cylinder 50, through unidirectional flow regulators 293, 294 and pilot controlled valve 295.

A further cam 296, on cam shaft 147B with its cam follower 297 and associated air valve 298 controls the supply of air to the hopper feed cylinder 66, through the solenoid operated valve 299.

A further cam 300, cam-follower 301, air valve 302, controls the supply of air to the triple lifting cam 31, 32, 33 actuator cylinder 28; a flow regulator 303 is included.

Again, cam 305, cam follower 306, air valve 307 controls the operation of the hopper agitator cylinder 72, through the flow control device 308.

The machine described has proved very satisfactory in operation, and permits the accurate gauging of drill bits at high speed, in the example described relating to medium sized drill bits, 1 per second i.e. 3600 per hour, to the extent that all drill bits in a production run can be tested fully, instead of resorting to sample testing, as has been necessary in the past.

What I claim is:

1. The method of automatically gauging a maximum diameter of an elongated tool bit having a cross-sectional outline which is approximately but not precisely circular, which comprises rotating said tool bit between gauging surfaces while maintaining said surfaces in contact with the tool bit at a first point along its length, deriving a first electrical signal which is a function of the separation of said surfaces and determining a peak value of a component of said signal indicative of the maximum separation of said surfaces, and hence of the maximum diameter of the tool bit at said first point, rotating said tool bit between gauging surfaces in contact with the tool bit at a second point along its length, deriving a second such electrical signal indicative of the maximum separation of the surfaces at said second point, and hence of the maximum diameter at that point, comparing said first signal with a signal of preset value to gauge the acceptability of the maximum diameter of the tool bit at said first point, establishing in accordance with said first signal effective tolerance limits for said second signal, and comparing said second signal with said first signal to establish the acceptability of the maximum diameter of the tool bit at the second point in reference to the maximum diameter at the first point.

2. A method in accordance with claim 1 and comprising registering the said value of said first signal, before deriving said second signal.

3. A method in accordance with claim 1, which comprises applying an alternating current signal to a transducer, said transducer being arranged, in response to the separation of said surfaces, to modulate said alternating current signal, the frequency of said alternating current signal being high enough to ensure that at the speed at which said tool bit is rotated between said gauging surfaces, a modulation of said signal, indicative of the maximum separation of said surfaces, will exist over a plurality of cycles of said alternating current.

4. A method in accordance with claim 3, which comprises amplitude modulating said alternating current signal.

5. An apparatus for automatically gauging the diameter of an elongated tool bit having a cross-sectional outline which is approximately but not precisely circular, said apparatus comprising first gauging means including first yieldingly spaced apart gauging surfaces, first means for rotating a bit to be engaged between said gauging surfaces in contact therewith at a first point of its length, second gauging means including second yieldingly spaced apart gauging surfaces, second means for rotating the bit to be gauged between said second gauging surfaces in contact therewith at a second point of its length, first detecting means coacting with said first gauging means for generating a first electric signal which is indicative of the maximum separation of the first gauging surfaces and hence of the maximum diameter of the tool bit at said first point, second detecting means coacting with said second gauging means for generating a second electric signal which is indicative of the maximum separation of the second gauging surfaces and hence of the maximum diameter of the tool bit at said second point, first signal comparing means comparing said first signal with a reference signal to establish the acceptability of the maximum diameter of the tool bit at said first point, and second signal comparing means comparing said first signal with said second signal to establish the acceptability of the maximum diameter of the tool bit at the second point in reference to the maximum diameter at the first point.

6. An apparatus in accordance with claim 5, and comprising means for presenting said bit to gauging surfaces at more than two positions along its length.

7. An apparatus in accordance with claim 6, wherein said gauging surfaces are parallel and said bit is rotated by means of relatively movable members having pivotal surfaces, and comprising means for moving said members to maintain said surfaces parallel and in contact with the tool bit.

8. An apparatus in accordance with claim 7, and comprising an extended flat surface, means for rolling a tool bit in a path across said surfaces, said first and second gauging surfaces being parallel to said extended surface and disposed at positions that are separated both along said path and transversely of said path, so as to respond in succession to different diameters of said bit.

9. An apparatus in accordance with claim 8, and comprising means for aligning a bit, with respect to said path before the bit is presented to the first gauging surfaces.

10. An apparatus in accordance with claim 9, and comprising means for re-aligning said bit before presenting it to the first and the second gauging surfaces.

11. An apparatus in accordance with claim 10, wherein said aligning means includes an aligning member having a surface that is movable between a position coplanar with said extended flat surface and a position below the plane of said surface, said member in the second position providing a groove for locating the longitudinal axis of the tool bit.

12. An apparatus in accordance with claim 11, and comprising drill bit feeding means for feeding a drill bit endwise in the groove formed by said aligning member, or the first of said aligning members.

13. An apparatus in accordance with claim 12, and comprising stop means for limiting the feed of a drill bit into said groove, thereby to determine the position along the length of the bit at which gauging is effected.

14. An apparatus in accordance with claim 13, and comprising a common driving means for said feeding means, said aligning means and the means for rolling the bit across the said extended surface, said driving means being arranged to feed a drill bit at each rolling operation, whereby a plurality of bits are simultaneously gauged.

15. An apparatus in accordance with claim 5 wherein each of said detecting means comprises a transducer for deriving said electrical signal indicative of the separation of the gauging surfaces.

16. An apparatus in accordance with claim 15, wherein each of said transducers is of the kind operating to produce an alternating current signal, modulated in accordance with the separation of said second gauging surfaces.

17. An apparatus in accordance with claim 16, wherein each of said signals is amplitude modulated.

18. An apparatus in accordance with claim 17, wherein at least several cycles of said signal are modulated in accordance wtih the maximum separation of the said gauging surfaces.

19. An apparatus in accordance with claim 5, and comprising a preliminary third gauging means, to which each tool bit is first applied, for detecting a bit of which a dimension lies above a predetermined value.

20. An apparatus in accordance with claim 5, and comprising tool bit sorting means operated in accordance with the results of gauging the bits, for directing to a first destination bits of which the diameter lies within acceptable limits and to a second destination bits of which the dimension is falling outside of said limits.

21. An apparatus in accordance with claim 20, and comprising means for directing to different destinations bits of the said dimension falling respectively above and below said limits.

References Cited by the Examiner
UNITED STATES PATENTS

| | | | |
|---|---|---|---|
| 1,586,155 | 5/26 | Keller | 209—85 |
| 2,531,317 | 11/50 | Baney | 209—82 |
| 2,765,076 | 10/56 | Caster | 209—88 |
| 2,863,222 | 12/58 | Comstock. | |
| 2,937,749 | 5/60 | Strzala | 209—88 |
| 2,969,598 | 1/61 | Voltaire. | |
| 3,064,809 | 11/62 | Anthony | 209—88 |

ROBERT B. REEVES, *Primary Examiner.*

LEONARD FORMAN, WILLIAM B. LABORDE,
*Examiners.*